United States Patent
Ahearn et al.

(10) Patent No.: US 9,262,879 B2
(45) Date of Patent: Feb. 16, 2016

(54) REMOTE NOTIFICATION OF PHONE FOR HOME SECURITY

(71) Applicant: Schlage Lock Company LLC, Indianapolis, IN (US)

(72) Inventors: John Robert Ahearn, Pasadena, CA (US); Joseph Wayne Baumgarte, Sunman, IN (US); Gabriel Daniel Focke, Indianapolis, IN (US); Michael Scott Henney, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 124 days.

(21) Appl. No.: 13/968,663

(22) Filed: Aug. 16, 2013

(65) Prior Publication Data

US 2014/0049368 A1 Feb. 20, 2014

Related U.S. Application Data

(60) Provisional application No. 61/684,086, filed on Aug. 16, 2012.

(51) Int. Cl.
*G07C 9/00* (2006.01)
*H04B 5/00* (2006.01)

(52) U.S. Cl.
CPC .......... *G07C 9/00174* (2013.01); *H04B 5/0006* (2013.01); *H04B 5/0031* (2013.01)

(58) Field of Classification Search
CPC .............................. H04B 5/0031; H04B 5/0006
USPC .......................................................... 340/5.61
See application file for complete search history.

(56) References Cited

U.S. PATENT DOCUMENTS

| | | | |
|---|---|---|---|
| 2003/0160681 A1 | 8/2003 | Menard et al. | |
| 2006/0170533 A1* | 8/2006 | Chioiu et al. | 340/5.61 |
| 2008/0129498 A1* | 6/2008 | Howarter et al. | 340/541 |
| 2009/0320538 A1 | 12/2009 | Pellaton | |
| 2010/0283579 A1* | 11/2010 | Kraus et al. | 340/5.7 |
| 2012/0280790 A1* | 11/2012 | Gerhardt et al. | 340/5.61 |
| 2014/0051355 A1 | 2/2014 | Ahearn et al. | |

OTHER PUBLICATIONS

International Search Report for PCT/US13/55448 dated Nov. 13, 2013, 2 pages.
Written Opinion of the International Searching Authority for PCT/US13/55448 dated Nov. 13, 2013, 4 pages.

* cited by examiner

*Primary Examiner* — Edwin Holloway, III
(74) *Attorney, Agent, or Firm* — Taft Stettinus & Hollister LLP

(57) ABSTRACT

A lock system is provided with a lock and a wireless device. The lock may be capable of sending and receiving Bluetooth messages to and from the wireless device, and the wireless device may be capable of sending and receiving Bluetooth messages to and from the lock.

12 Claims, 1 Drawing Sheet

The person at the door presses the Schlage button and "rings the doorbell". The lock then sends a message to the phone to announce the presence of the person at the door.
Or
Like NCAR, the door sends a message to the phone if anyone tries to use the door, or kick it in.
Or
Convey any other useful information between the lock and the phone.

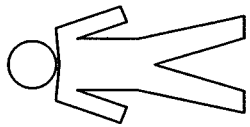
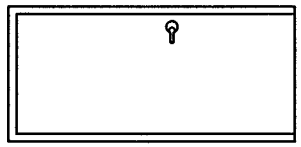
The person at the door presses the Schlage button and "rings the doorbell". The lock then sends a message to the phone to announce the presence of the person at the door.
Or
Like NCAR, the door sends a message to the phone if anyone tries to use the door, or kick it in.
Or
Convey any other useful information between the lock and the phone.

REMOTE NOTIFICATION OF PHONE FOR HOME SECURITY

CROSS-REFERENCE TO RELATED APPLICATIONS

The present application claims the benefit of U.S. Provisional Patent Application No. 61/684,086 filed on Aug. 16, 2012, the contents of which are incorporated herein by reference in their entirety.

BACKGROUND

The disclosed embodiments generally pertain to locks, and particularly to smart lock systems.

SUMMARY

A lock system is provided with a lock and a wireless device. In one form the wireless device is a smart phone. The lock may be capable of sending and receiving BLE messages to and from the wireless device, and the wireless device may be capable of sending and receiving BLE messages to and from the lock.

BRIEF DESCRIPTION OF THE ILLUSTRATIONS

Embodiments of the invention are illustrated in the following illustrations.

FIG. 1 is schematic of a wireless device receiving a message from a door lock.

DETAILED DESCRIPTION

Referring now to FIG. 1, a schematic of a wireless device, such as a smart phone, receiving a message from a door lock is provided. The lock system can have NCAR capabilities through BLE. In one form a lock is provided with Bluetooth or Bluetooth low energy ("BLE") capabilities. A customizable BLE message could be sent to the phone from the lock. For example, the lock could send a message to the phone anytime a door is opened, closes, either handle on either side of the door moves, or a shock event, such as someone trying to kick in the door.

The lock could be programmed with alarms, text messages, emergency phone calls, and the like with "Nexia-like" back end already available in a house.

A doorbell could be connected to the lock that would send a message wirelessly to the wireless device. The lock may also be capable of triggering another wireless BLE device, such as a wireless door chime that could be triggerable by the lock (e.g. Schlage button).

In one form the wireless device includes a microphone that can be used to create audio memos that could then be sent to the lock. In one form the wireless device is a smart phone. The lock could then replay these audio memos to a person having the proper credentials, such as another specific smart phone associated with the lock. A speech to text feature could also be incorporated to create grocery lists, to do lists, and the like, and store it in the lock for retrieval later such as before heading out the door or for leaving a reminder when coming home. A parent could, for example, leave a to do list for a child when they come home from school.

The lock system would incorporate any number of wireless devices and particularly any number of smart phones. The lock could be installed, then an appropriate app could be installed on the phone to be associated that particular lock. The lock manufacturer would not have to supply any particular wireless device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used item can include a portion and/or the entire item unless specifically stated to the contrary.

What is claimed is:

1. A lock system, comprising:
   a programmable lock having Bluetooth capabilities; and
   a first smart phone having Bluetooth capabilities configured to communicate with the Bluetooth capabilities of the lock, wherein the first smart phone includes a microphone and is configured to create audio memos; and
   wherein the lock is configured to send and receive Bluetooth messages to and from the first smart phone;
   wherein the first smart phone is configured to send and receive Bluetooth messages to and from the lock, the first smart phone being configured to send the audio memos to the lock via a Bluetooth message and the lock is configured to receive the audio memos and to store the audio memos in a memory of the lock; and
   a second smart phone configured with credentials associated with the lock, the lock being configured to replay the audio memos to the second smart phone.

2. The lock system of claim 1, wherein the Bluetooth capabilities of the lock comprise Bluetooth low energy (BLE) capabilities.

3. The lock system of claim 1, wherein the Bluetooth capabilities of the first smart phone comprise Bluetooth low energy (BLE) capabilities.

4. The lock system of claim 1, wherein the lock is configured to send a Bluetooth message to the first smart phone corresponding to the opening or closing of a door.

5. The lock system of claim 1, wherein the lock is configured to send a Bluetooth message to the first smart phone corresponding to movement of a door handle.

6. The lock system of claim 1, wherein the lock is configured to send a Bluetooth message to the first smart phone corresponding to a door kick in event.

7. The lock system of claim 1, wherein the lock is in programmable communication with a remote control panel.

8. The lock system of claim 1, further comprising a doorbell connected to the lock and configured to send a wireless message to the first smart phone.

9. The lock system of claim 1, wherein the lock is configured to trigger a wireless device via a Bluetooth message.

10. The lock system of claim 9, wherein the wireless device comprises a wireless door chime triggerable by the lock.

11. The lock system of claim 1, wherein the first smart phone includes speech to text capabilities.

12. The lock system of claim 1, further comprising two or more wireless devices that are each configured to communicate with the Bluetooth capabilities of the lock.

* * * * *